US010360377B2

(12) United States Patent
Song

(10) Patent No.: US 10,360,377 B2
(45) Date of Patent: *Jul. 23, 2019

(54) DEVICE, SYSTEM, AND METHOD OF OBFUSCATING AN UN-OBFUSCATED VISUAL CONTENT DISPLAYED ON A MOBILE DEVICE

(71) Applicant: Kairos Social Solutions, Inc., Dallas, TX (US)

(72) Inventor: Tailim Song, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/656,005

(22) Filed: Jul. 21, 2017

(65) Prior Publication Data

US 2017/0323099 A1 Nov. 9, 2017

Related U.S. Application Data

(63) Continuation of application No. 14/632,595, filed on Feb. 26, 2015, now Pat. No. 9,740,860.

(51) Int. Cl.
*G06F 21/55* (2013.01)
*H04W 12/02* (2009.01)

(52) U.S. Cl.
CPC .......... *G06F 21/554* (2013.01); *H04W 12/02* (2013.01); *G06F 2221/032* (2013.01)

(58) Field of Classification Search
None
See application file for complete search history.

(56) References Cited

U.S. PATENT DOCUMENTS

| 8,429,745 | B1* | 4/2013 | Casaburi | G06F 21/554 |
| | | | | 726/1 |
| 9,063,646 | B2* | 6/2015 | Ozawa | G06F 3/0488 |
| 9,076,231 | B1* | 7/2015 | Hill | G06T 3/4023 |
| 9,423,901 | B2* | 8/2016 | Bustamante | G06F 3/0412 |
| 9,740,860 | B2* | 8/2017 | Song | G06F 21/554 |
| 2004/0202382 | A1* | 10/2004 | Pilu | H04N 1/00167 |
| | | | | 382/276 |
| 2012/0131471 | A1* | 5/2012 | Terlouw | G06F 3/04883 |
| | | | | 715/741 |
| 2014/0201844 | A1* | 7/2014 | Buck | G06F 21/50 |
| | | | | 726/26 |
| 2014/0354663 | A1* | 12/2014 | Takahashi | H04N 1/32122 |
| | | | | 345/530 |
| 2015/0264573 | A1* | 9/2015 | Giordano | H04L 63/08 |
| | | | | 726/7 |
| 2015/0281445 | A1* | 10/2015 | Kumar | H04M 3/5166 |
| | | | | 379/88.01 |
| 2015/0302600 | A1* | 10/2015 | Kreder, III | G06K 9/34 |
| | | | | 382/283 |

(Continued)

*Primary Examiner* — Christopher A Revak

(57) ABSTRACT

A message is received via a first mobile device. The message is sent from a second mobile device. The message contains unobfuscated visual content. The un-obfuscated visual content is displayed on a screen of the first mobile device. A detection is made via the first mobile device that a first user of the first mobile device made one or more engagements with the first mobile device. Based on the detecting, a determination is made that the first user is attempting to screenshot the un-obfuscated visual content via the first mobile device. In response to the determining, the un-obfuscated visual content displayed on the screen of the first mobile device is obfuscated.

19 Claims, 18 Drawing Sheets

(56) References Cited

U.S. PATENT DOCUMENTS

| | | | |
|---|---|---|---|
| 2016/0196442 A1* | 7/2016 | Chapman, III | G06F 21/53 |
| | | | 726/29 |
| 2016/0357947 A1* | 12/2016 | Cohen | G06F 3/013 |
| 2017/0060495 A1* | 3/2017 | Awatsu | G06F 3/1222 |
| 2017/0068829 A1* | 3/2017 | Shaw | G06F 21/6281 |
| 2017/0083170 A1* | 3/2017 | Oliver | G06F 9/4443 |
| 2017/0201476 A1* | 7/2017 | Zou | H04L 51/04 |
| 2018/0348999 A1* | 12/2018 | Wu | G06F 9/451 |

* cited by examiner

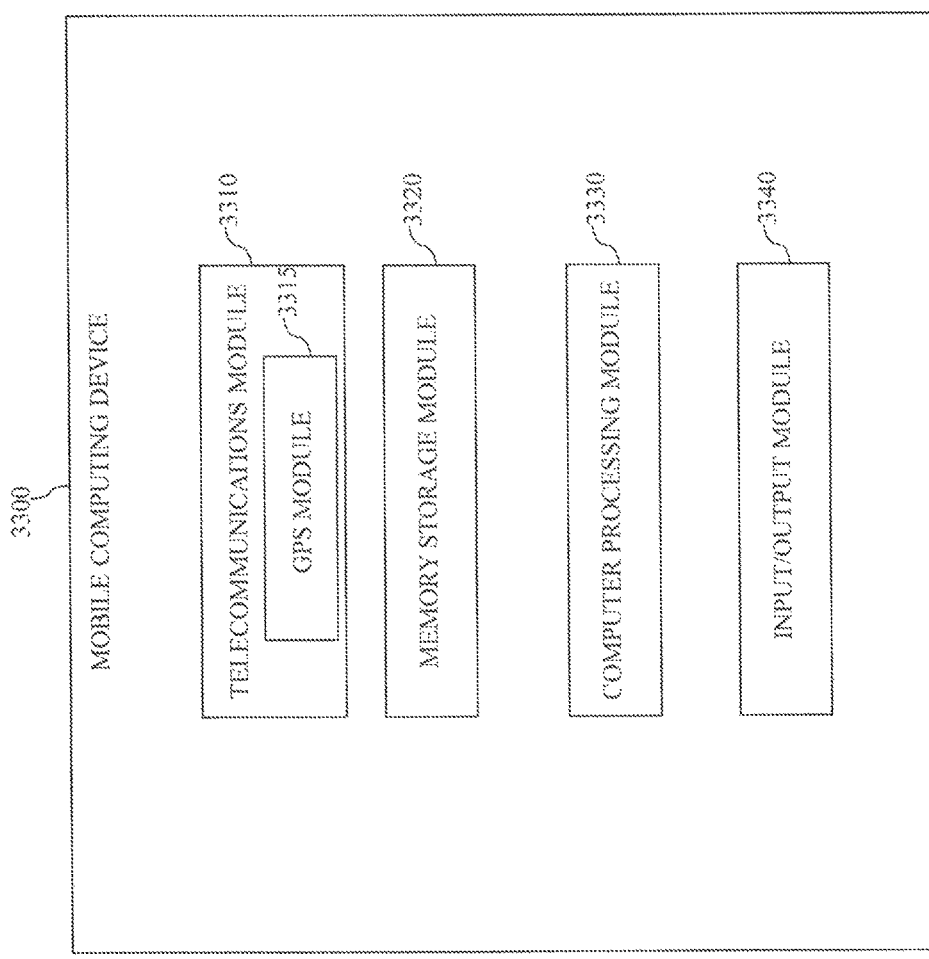

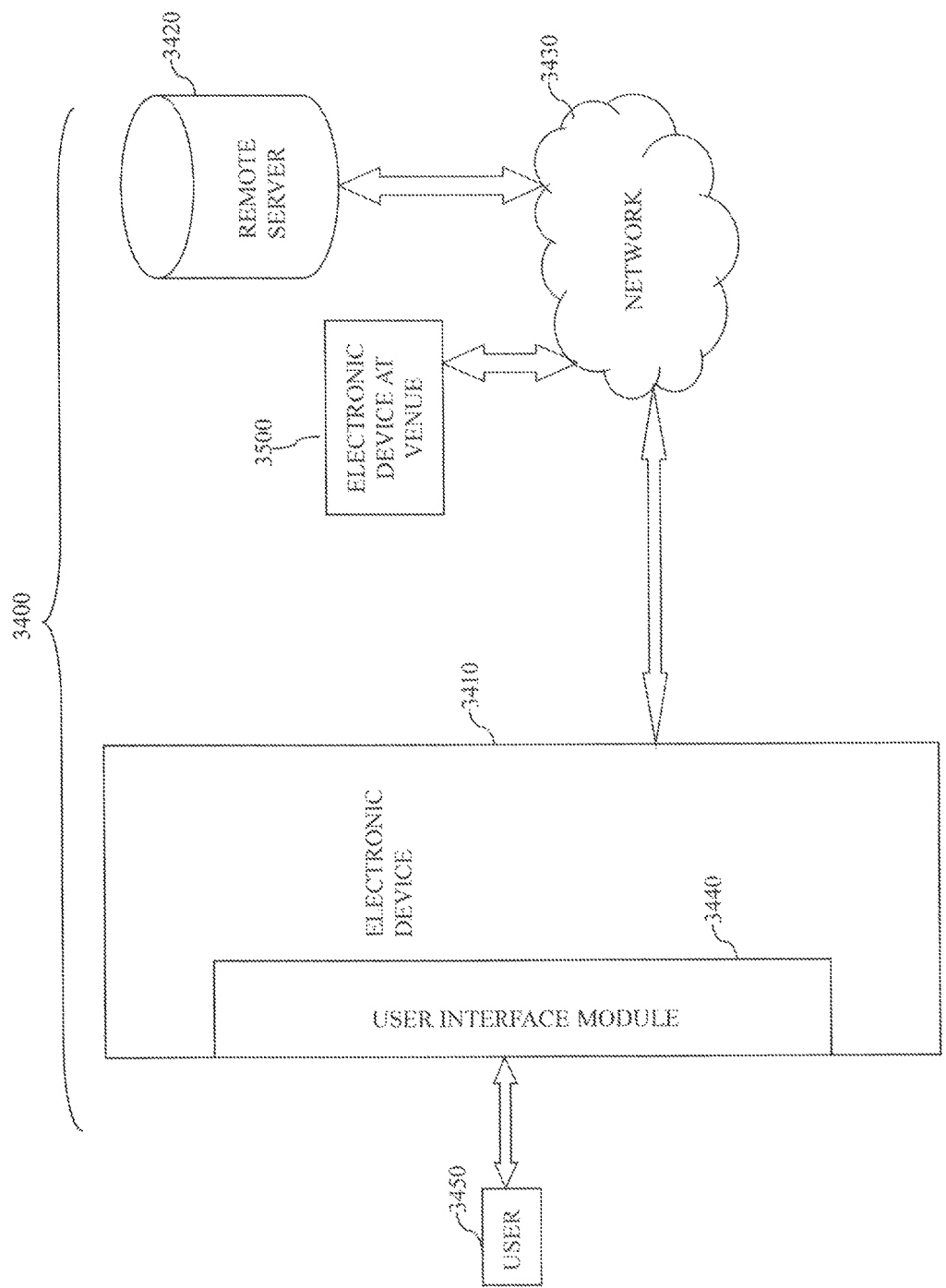

US 10,360,377 B2

DEVICE, SYSTEM, AND METHOD OF OBFUSCATING AN UN-OBFUSCATED VISUAL CONTENT DISPLAYED ON A MOBILE DEVICE

PRIORITY DATA

The present application is a continuation of U.S. patent application Ser. No. 14/632,595, filed on Feb. 26, 2015, entitled "Device System and Method of Preventing Unauthorized Recording of Visual Content Displayed on an Electronic Device", the disclosure of which is hereby incorporated by reference in its entirety.

BACKGROUND

Technical Field

The present disclosure generally relates to electronic social networking, and more specifically, preventing unauthorized recording of visual content displayed on an electronic device.

Related Art

In recent years, the rapid advances in computer technology and broadband telecommunications have enhanced the popularity of mobile computing devices such as smartphones and tablet computers. Among other things, these mobile computing devices can be used to browse the web, play games, music, or videos, take pictures, send/receive emails, etc. Recently, mobile computing devices have been used to engage in electronic social networking. However, existing mobile computing devices still have shortcomings in the electronic social networking context. For example, existing mobile computing devices do not sufficiently prevent unauthorized recording of visual content displayed on its screen.

In that regard, most mobile computing devices are equipped with cameras that can be used to take digital pictures or videos, which can then be quickly shared electronically with one or more users. The ease in which the pictures and videos can be captured and shared with mobile computing devices has greatly increased the popularity of using mobile computing devices in the social net working aspect. In certain situations, the sender of a picture or video may only wish to share the picture or video temporarily, and after a specified period of time, the shared picture or video should be automatically erased from the recipient's mobile computing device. However, some recipients may obtain unauthorized recording of the shared picture or video by taking screenshots or recording them via another camera-equipped electronic device. This is a violation of the sender's privacy and may discourage the sharing of pictures or videos by the sender and/or other users.

Therefore, while existing mobile computing devices have been generally adequate for their intended purposes, they have not been entirely satisfactory in every aspect.

SUMMARY

One aspect of the present disclosure is directed to a method. The method includes: detecting, via a mobile computing device, that a user is attempting to digitally record visual content being displayed on a screen of the mobile computing device; and performing, via the mobile computing device, at least one of the following actions in response to the detecting: obfuscating the visual content; restarting the mobile computing device before the visual content is recorded; playing a loud audio signal via the mobile computing device before the visual content is recorded; and temporarily disabling a screenshot function of the mobile computing device.

Another aspect of the present disclosure is directed to a mobile computing device. The mobile computing device include: a screen configured to display visual content; an electronic memory storage component configured to store computing programming instructions; and one or more electronic processors configured to executed the programming instructions to perform the following steps: detecting that a user of the mobile computing device is attempting to digitally record visual content being displayed on the screen; and performing, via the mobile computing device, at least one of the following actions in response to the detecting: obfuscating the visual content; restarting the mobile computing device before the visual content is recorded; playing a loud audio signal via the mobile computing device before the visual content is recorded; and temporarily disabling a screenshot function of the mobile computing device.

Another aspect of the present disclosure is directed to a system. The system includes: an electronic memory storage component configured to store computing programming instructions; and one or more electronic processors configured to executed the programming instructions to perform the following steps: detecting that a user of the mobile computing device is attempting to digitally record visual content being displayed on a screen of a mobile computing device, wherein the visual content includes a picture or a video; and causing at least one of the following actions to be performed in response to the detecting: obfuscating the visual content; restarting the mobile computing device before the visual content is recorded; playing a loud audio signal via the mobile computing device before the visual content is recorded; and temporarily disabling a screenshot function of the mobile computing device.

BRIEF DESCRIPTION OF THE DRAWINGS

FIG. 17 is a simplified block diagram of an example mobile computing device for performing one or more of the processes discussed with reference to FIGS. 1-16 according to various aspects of the present disclosure.

FIG. 18 is a simplified block diagram of an example system for performing one or more of the processes discussed with reference to FIGS. 1-16 according to various aspects of the present disclosure.

DETAILED DESCRIPTION

Figure 1:
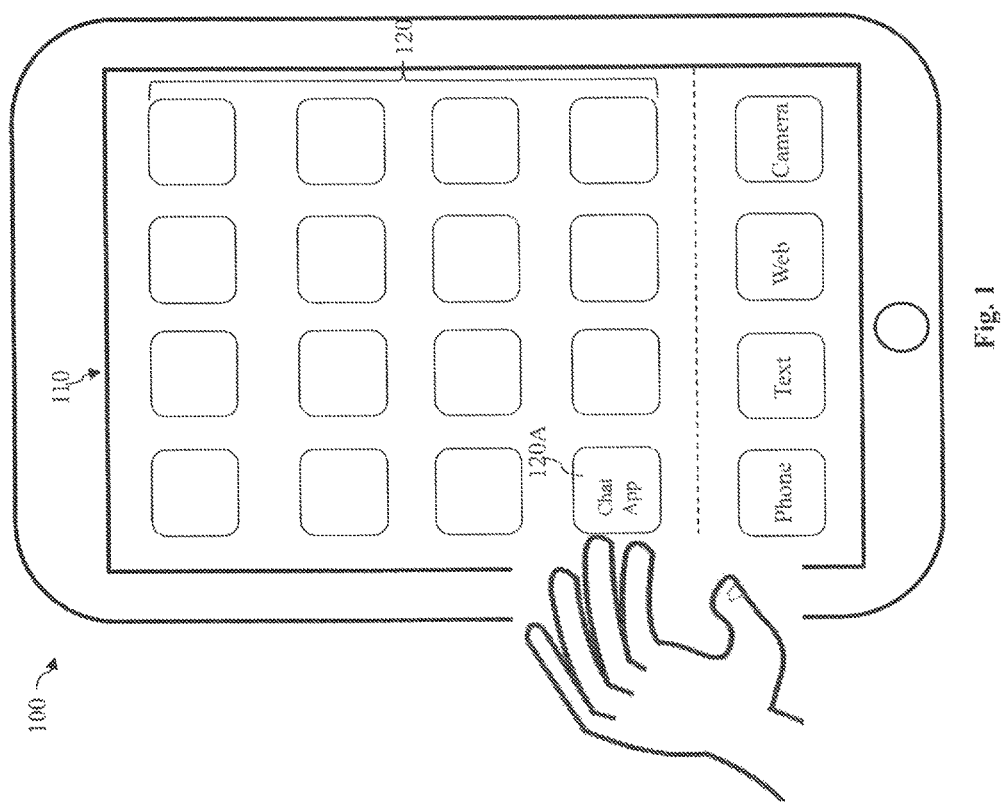
FIGS. 1-15 are diagrammatic views of one or more example mobile computing devices and the content displayed thereon according to various aspects of the present disclosure.

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity. In addition, the present disclosure may repeat reference numerals and/or letters in the various examples. This repetition is for the purpose of simplicity and clarity and does not in itself dictate a relationship between the various embodiments and/or configurations discussed As used herein, the term "about" refers to a +/−5% variation from the nominal value. As used herein, the term "and/or" includes any and all combinations of one or more of the associated, listed, items. As used herein, the singular forms "a", "an" and "the" are intended to include the plurality forms as well, unless the context, clearly and specifically indicates otherwise. In addition, unless defined otherwise, all technical and scientific terms used herein have the same meaning as commonly understood by one of ordinary skill in the art to which this disclosure belongs.

In recent years, the rapid advances in computer technology and broadband telecommunications have increased the popularity of mobile computing devices such as tablet computers and mobile telephones. Recently, mobile computing devices have been used to engage in electronic social networking. In that regard, most mobile computing devices are equipped with cameras that can be used to take digital pictures or videos, which can then be quickly shared, electronically with one or more users. The ease in which the pictures and videos can be captured and shared via mobile computing devices has greatly increased the popularity of using mobile computing devices in the social networking aspect.

There are times when the sender of a picture or video wishes to share the picture or video only temporarily. In these situations, the sender of the picture or video may specify an amount of time for viewing, and the picture or video will then be automatically erased from the recipient's mobile computing device after the picture or video has been viewed for that amount of time. However, some recipients may choose to electronically record the sender's pictures or videos against the sender's wishes. For example, the recipient may use his/her mobile computing device to take a screenshot of the sender's picture or video. As another example, the recipient may also use a camera to record a picture or video of the screen of an electronic device that is displaying the sender's picture or video. By doing so, the recipient can obtain a permanent digital copy of the sender's picture or video even after the original picture or video (sent by the sender) has been erased from, the recipient's mobile computing device. Although this is a violation of the sender's privacy and trust, existing mobile computing devices have not been able to prevent such unauthorized recording of the sender's picture or video.

To overcome the problems discussed above, the present disclosure is directed to a mobile computing device with custom software implemented thereon to prevent unauthorized recording of visual content (e.g., picture or video specified by the sender to be private and should be automatically deleted) displayed on said mobile computing device.

Referring to FIG. 1, a simplified diagrammatic view of a mobile computing device 100 is illustrated. In some embodiments, the mobile computing device 100 may be a smartphone (for example, APPLE's® IPHONE®, an ANDROID® phone, a WINDOWS® phone, or a BLACKBERRY®), a tablet computer (for example, APPLE's® IPAD®, an ANDROID® tablet, a WINDOWS® powered tablet, or a BLACKBERRY® tablet), or a laptop-tablet hybrid.

In some embodiments, the mobile computing device 100 may include a screen 110 for displaying visual information.

The screen 110 may be touch-sensitive. A user may interactively engage with objects shown on the screen 110 by touching the objects with a finger, a stylus, or by hovering over the object. In some embodiments, the user may engage with the objects shown on the screen 110 even while wearing gloves or other clothing.

Visual content may be displayed on the screen 110 once the screen 110 is activated. The visual content may include a plurality of icons, for examples icons 120 that are arranged into rows and columns. Each of these icons 120 may represent an application (app) that can be executed to perform a particular function. These apps 120 may be electronically downloaded from an apps stare, as such APPLE's® APP STORE® or GOOGLE's® GOOGLE PLAY®, etc.

Figure 2:
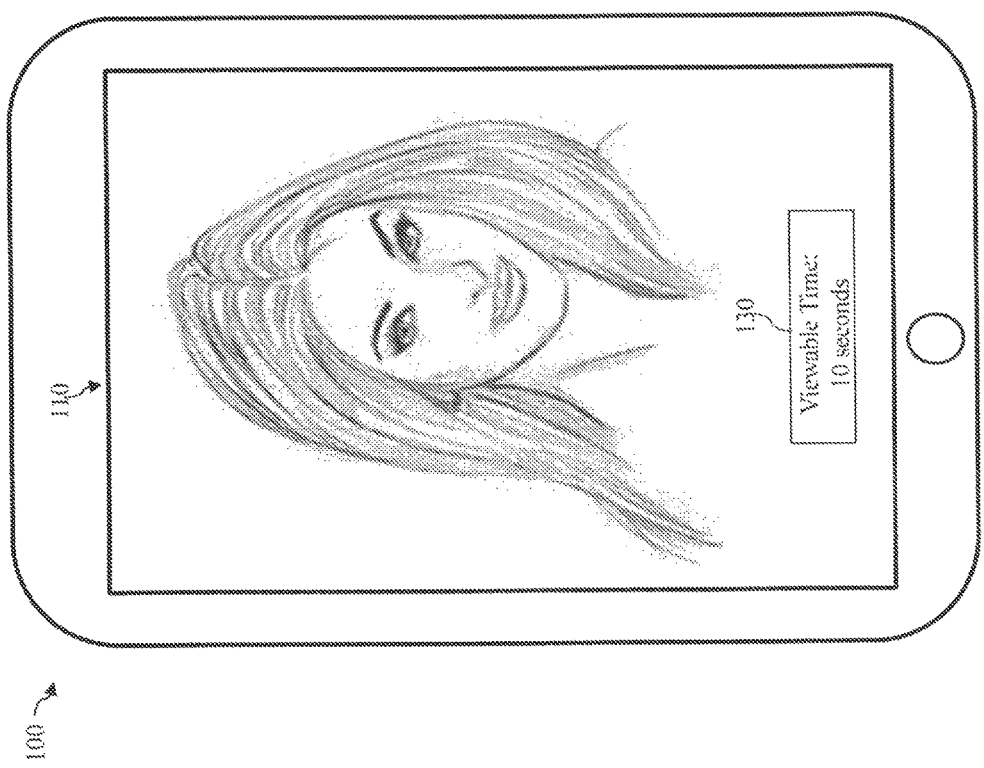

One of these apps 120A is the app that includes the custom software that can be executed to conduct electronic social networking. For example, referring to FIG. 2, a user A of the mobile computing device 100 may take an electronic or digital picture or video of herself. The user A may also specify a viewable timer 130 that dictates the amount of time (e.g., 10 seconds) for which the digital picture or video may be viewed by a recipient before the digital picture or video is erased from the recipient's electronic device.

Figure 3:
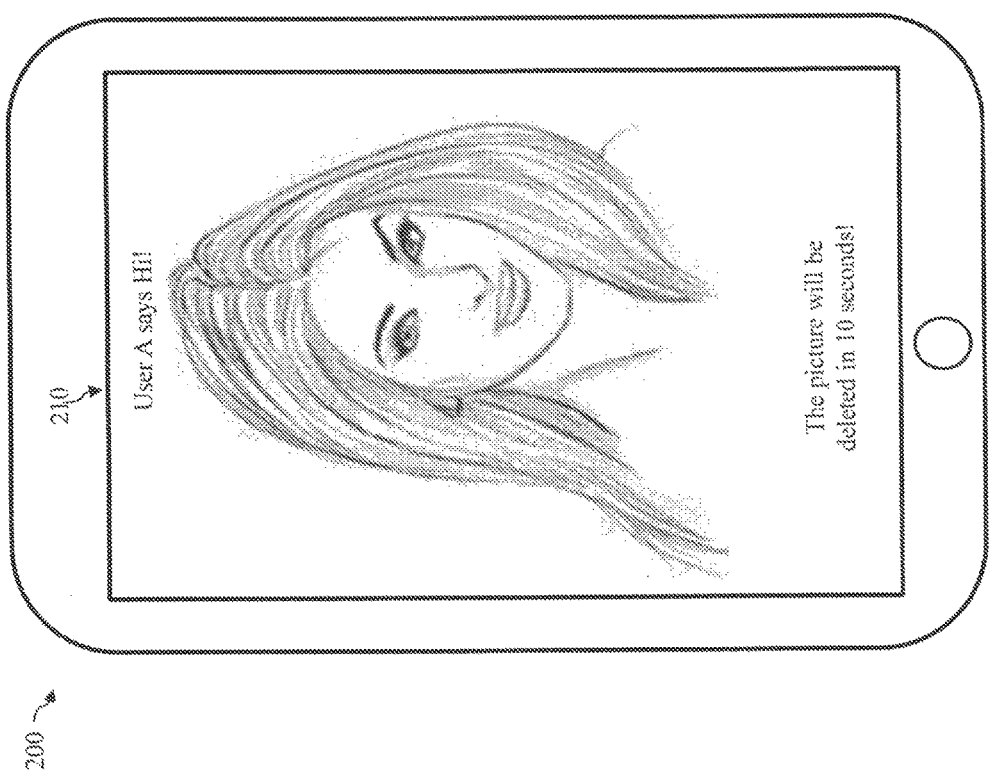

FIG. 3 illustrates a mobile computing device 200 of a recipient (hereinafter referred to as user B) who has received an electronic or digital copy of the picture or video sent by the user A. The user B receives the electronic or digital copy of the picture or video sent by the user A through the app 120A as well. For the sake of providing an example, the app 120A allows the users A and B to communicate with each other under an electronic social networking environment described in U.S. patent application Ser. No. 14/492,151, filed on Sep. 22, 2014, entitled "Device, system, and method of enhancing user privacy and security within a location-based virtual social networking context," to Song, et. al., the disclosure of which is hereby incorporated by reference in its entirety. However, the users A and B may be engaged in other suitable social networking situations, such as chatting applications or picture/video sharing applications.

In any case, after user B receives the digital picture or video from user A and decides to view it, he is notified that he only has 10 seconds (the amount of time specified by the sender user A) to view the picture or video on a screen 210 of the mobile computing device 200 before the picture or video is permanently deleted from the mobile computing device 200. In some embodiments, the picture or video sent by the user A is temporarily stored on a remote server, which is accessible by the mobile computing device 200 of user B for the temporary viewing. After the amount of time specified by user A is up, the picture or video is deleted from the server, and user B theoretically cannot view it anymore. In some other embodiments, the picture or video sent by the user A is temporarily stored on a memory storage of the mobile computing device 200 (e.g., RAM) for the temporary viewing. After the amount of time specified by user A is up, the picture or video is deleted from the memory storage of the mobile computing device 200, and user B theoretically cannot view it anymore either.

To illustrate the concepts of the present disclosure, suppose that user B now decides to record the picture or video of sent by user A against her wishes. For example, the user B may attempt to record a screenshot of the picture or video being displayed on the screen 210 of the mobile computing device 200. The riser B's attempt to screenshot the visual content (e.g., the picture or video sent by user A) displayed on the screen 210 is detected by the mobile computing device 200. In some embodiments, to take a screenshot of the visual content displayed on the screen 210, the user B needs to press and/or hold certain buttons. For example, for Apple's iPhones, the power (or sleep/wake) button and the home button need to be pressed simultaneously to record a screenshot. Accordingly, if the mobile computing device 200 is an iphone, then the mobile computing device 200 may determine that the user B is attempting to take a screenshot if it detects that the power button and the home button have been simultaneously engaged (e.g., pressed down) by the user B. As another example, for some Android devices, the user B may simultaneously press the power button and a volume up (or volume down) button in order to take a screenshot of the visual content displayed on the screen 210. Thus, if the mobile computing device 200 is one of these Android phones, then the mobile computing device 200 may determine that the user B is attempting to take a screenshot if it detects that the power button and the volume up (or volume down) button have been simultaneously engaged (e.g., pressed down) by the user B. As yet another example, some Android devices allow the user to swipe his/her palm across the screen of the Android device in order to take a screenshot. For these devices, they may determine that the user B is taking a screenshot if they detect a swiping of a hand across the screen 210.

It is also understood that other devices may utilize different mechanisms to take screenshots, but for the sake of simplicity, these different mechanisms are not specifically discussed herein. Regardless of the specific mechanism used to invoke the screenshot, it is understood that the mobile computing device 200 may determine that the user B is attempting to screenshot the visual content displayed on the screen 210 once it detects the correct sequence of user engagements (e.g., the power and home buttons being pressed simultaneously, the power and volume buttons being pressed simultaneously, swiping of a hand/palm across the screen 210 etc.) with the mobile computing device 200 corresponding to taking a screenshot.

Figure 4:
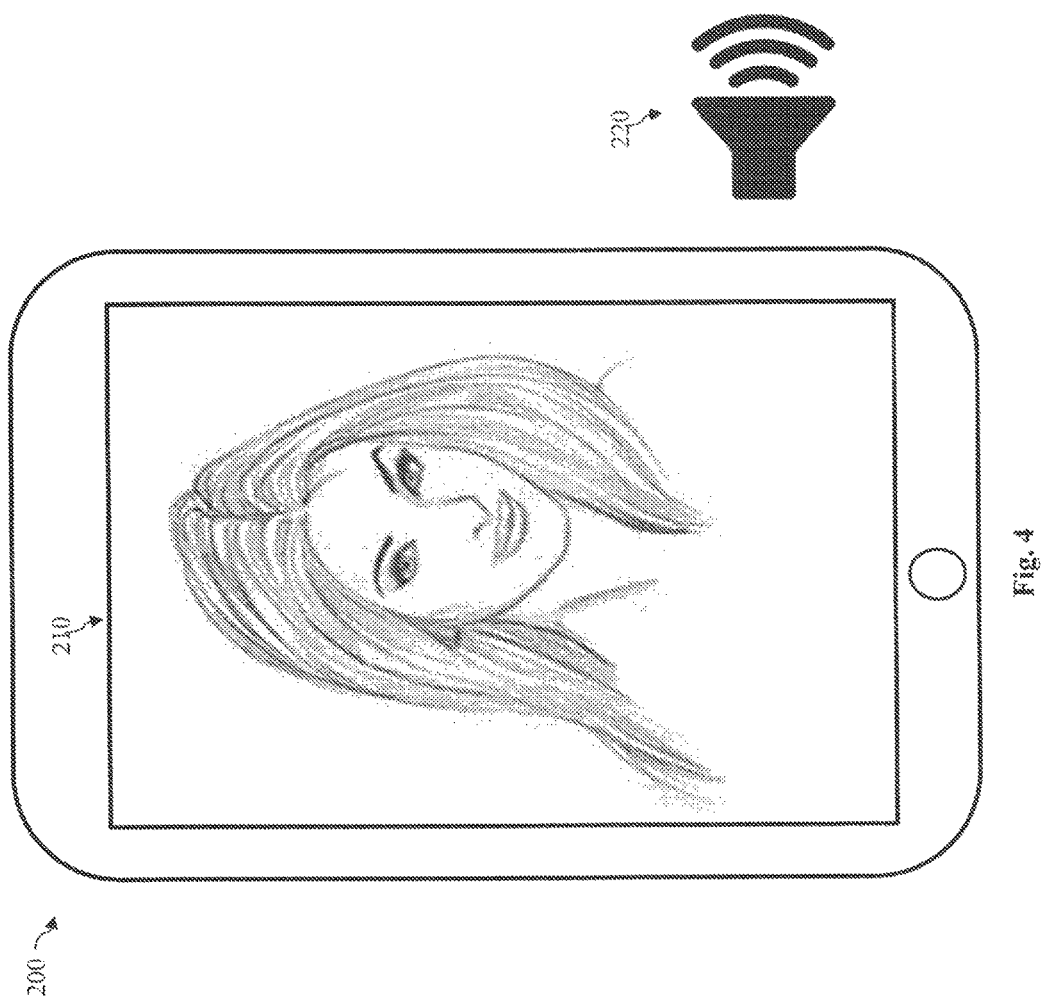

Once the mobile computing device 200 detects that the user B has attempted to record a screenshot of the visual content displayed on the screen 210, it may perform one or more of the following actions. Referring to FIG. 4, one of these actions is to play a loud audio signal 220 via the speakers of the mobile computing device 200 before the screenshot of the visual content (i.e., the picture or video sent by user A) is actually recorded and saved into the memory or electronic storage of the mobile computing device 200. The load audio signal 220 may be a chime, a ding, a beep, a warning message, or any sound loud enough to create a warning effect so as to discourage the user B from trying to record a screenshot of the visual content without the sender's (user A) permission.

Another of these actions is to temporarily disable the screenshot function of the mobile computing device 200. For example, upon being launched, the app 120A on the mobile computing device 200 may send instructions to the operating system running on the mobile computing device 200 to disable any screenshot functionalities as long as the app 120A is actively running, or as long as the user B is using the app 120A to peruse visual content sent by other users. Once the user B logs out or exit the app 120A, or stops viewing visual content sent by others via the app 120A, the app 120A may instruct the operating system to resume the screenshot functionalities.

Figure 5:
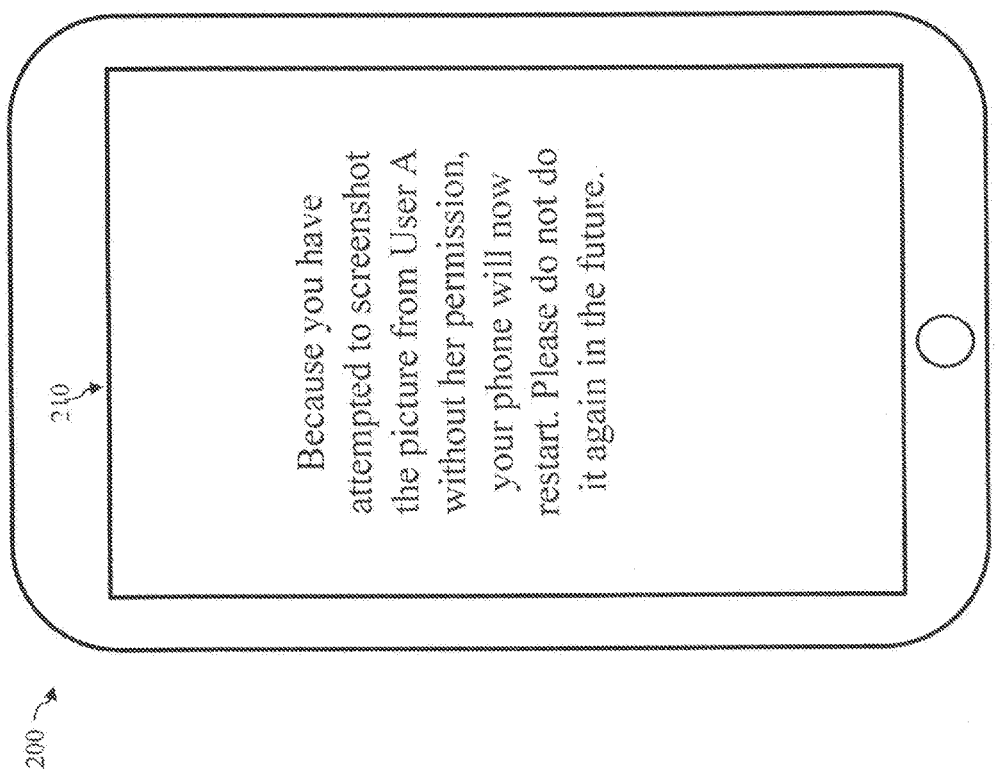
Figure 6:
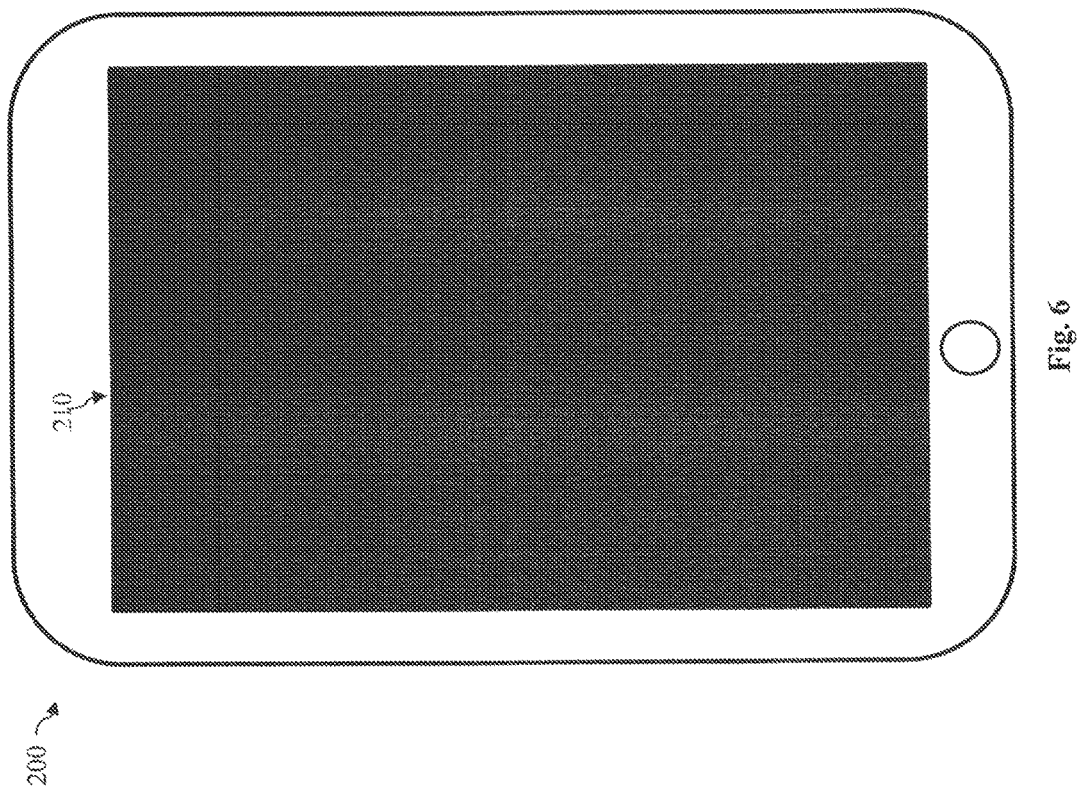

Referring to FIG. 5, another one of these actions is to restart or reboot the mobile computing device 200 before the screenshot can be recorded. The screen 210 may display a message like "Because you have attempted to screenshot the picture from User A without her permission, your phone will now restart. Please do not do it again in the future." In some embodiments, as soon as the mobile computing device 200 detects the correct sequence of user engagements with the mobile computing device 200 indicating that he wants to take a screenshot of the visual content being displayed on the screen 210, the app 120A instructs the operating system of the mobile computing device 200 to perform a reboot rather than to capture a screenshot. Thus, the user B's efforts to record the visual content without authorization will tail. Not only that, the fact that his mobile computing device 200 is now rebooting will likely frustrate him, thereby discouraging him from repeating unauthorized recording of visual content in the future.

Referring now to FIGS. 6-12, yet another one of these actions is to obfuscate the visual content. The obfuscation of the visual content is done in a manner so as to render the original visual content obscure, unclear, or unintelligible, so as to defeat the user B's intention of capturing and preserving a clear copy of the picture or video sent by user A. In the embodiment shown in FIG. 6, the obfuscation of the visual content is done by darkening the screen 210. In one example, the screen 210 is darkened by turning off (or mostly off) the LED backlighting of the mobile computing device 200, which renders the screen 210 so dark that any visual content thereon cannot be clearly identified. As yet another example, the screen 210 is darkened by turning all (or a substantial portion) of the pixels on the screen 210 to a black color, a gray color, or another similar dark color. As such, this defeats the user B's intention of capturing the picture or video sent by user A without her authorization.

Figure 7:
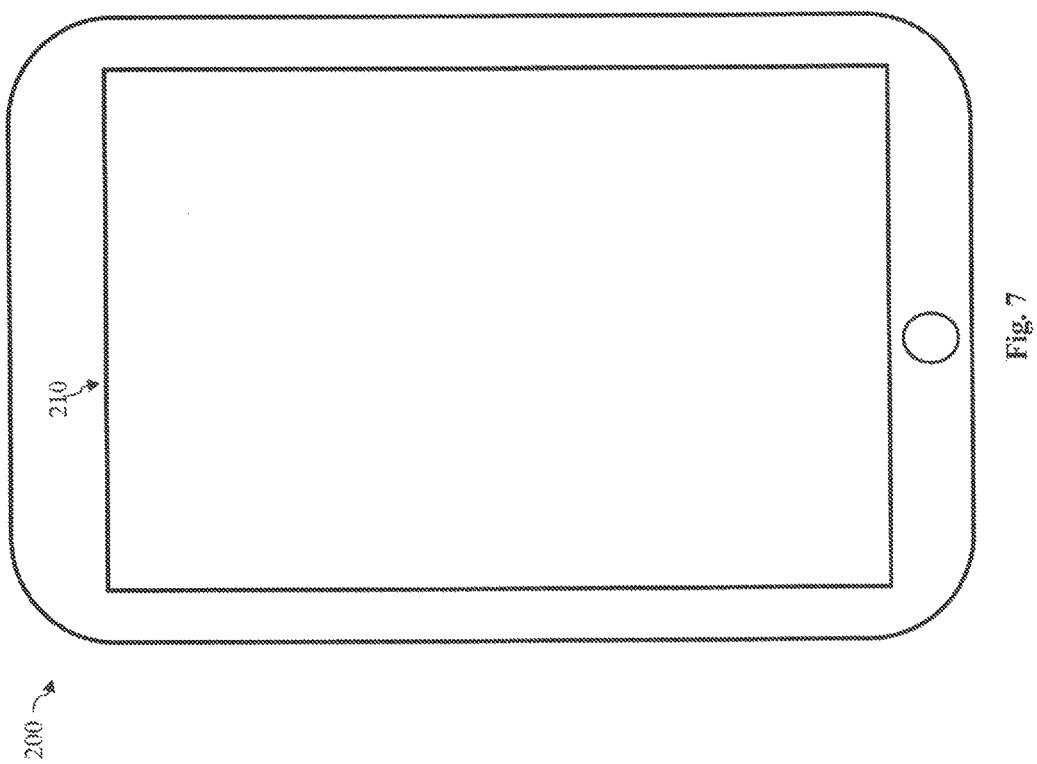

Referring now to the embodiment show n in FIG. 7, the obfuscation of the visual content may also be performed by discoloring the screen 210. In one example, the screen 210 is darkened by turning ail (or a substantial portion) of the pixel s on the screen 210 to a white color, a red color, a green color, a blue color, a yellow color, a purple color, an orange color, etc. Alternatively, some of the pixels on the screen 210 may be turned to one color while other pixels are turned to another color. As long as the original visual content cannot be clearly identified, the discoloration herein has served its purpose.

Figure 8:
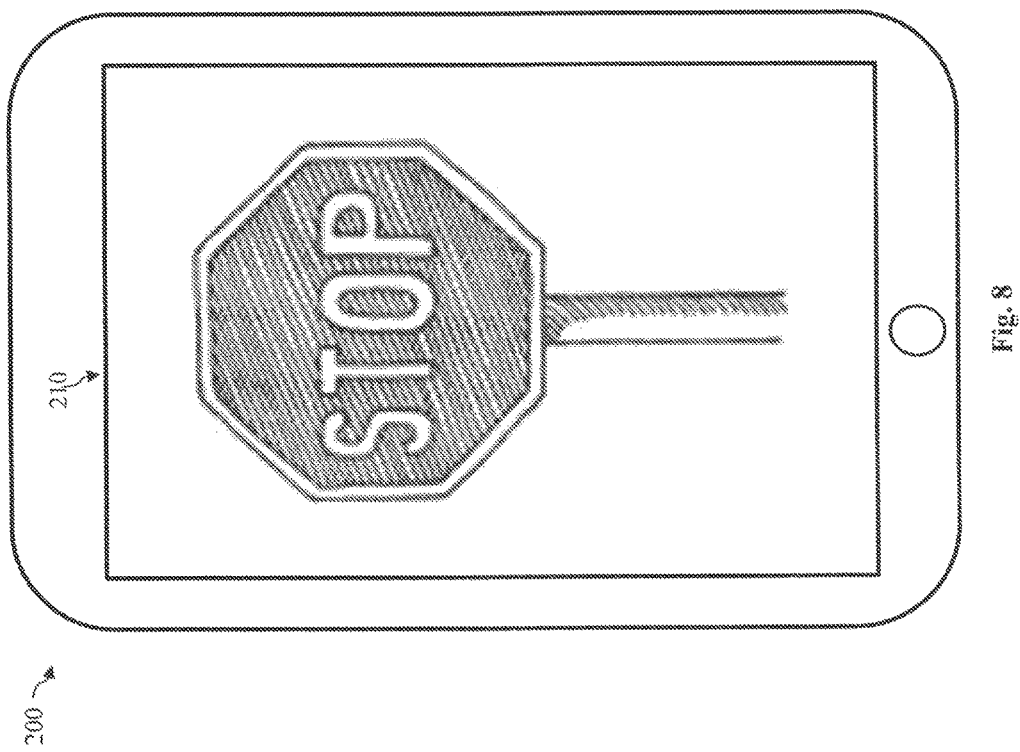
Figure 9:
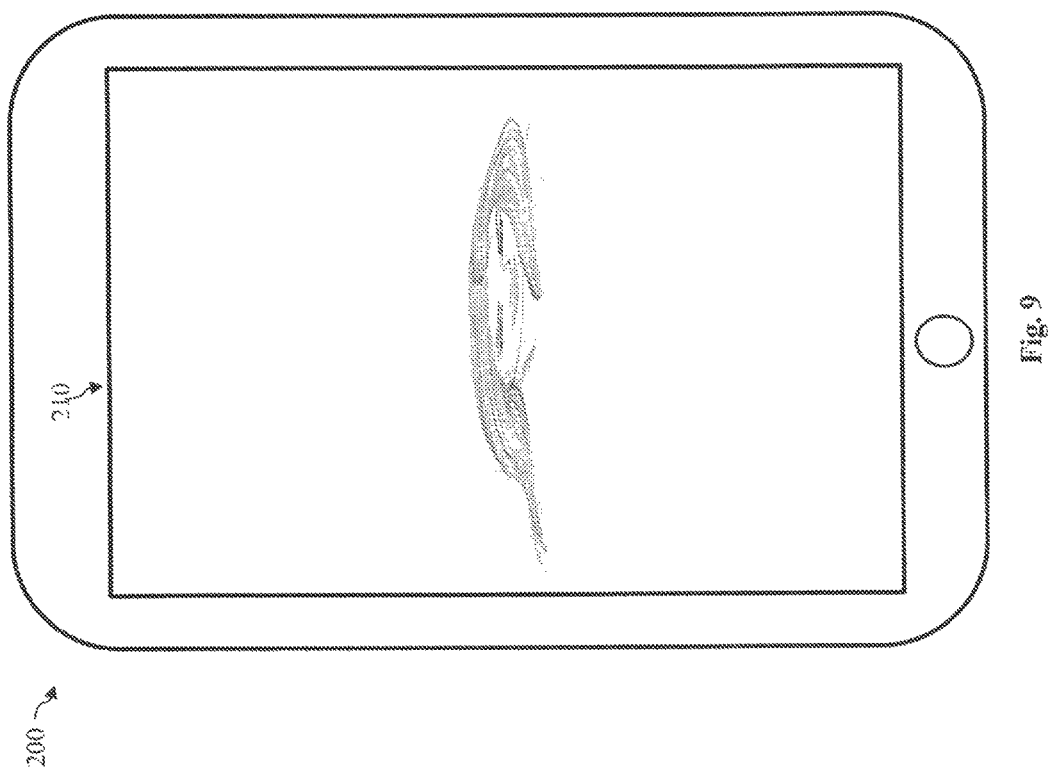
Figure 10:
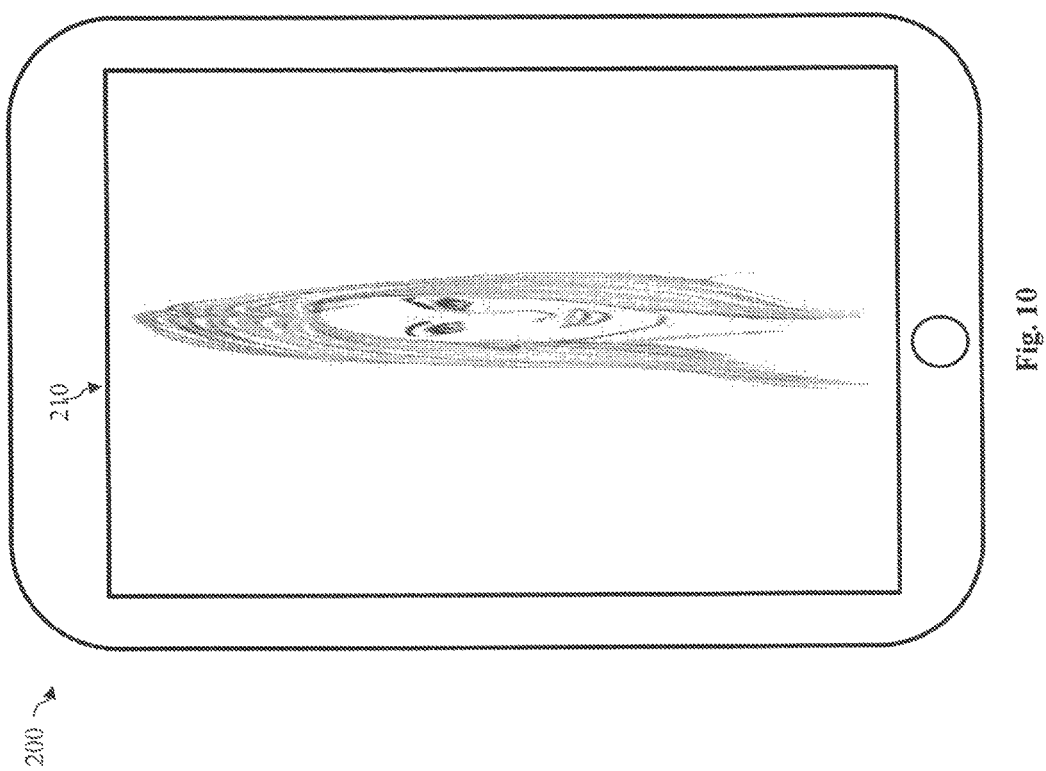
Figure 11:
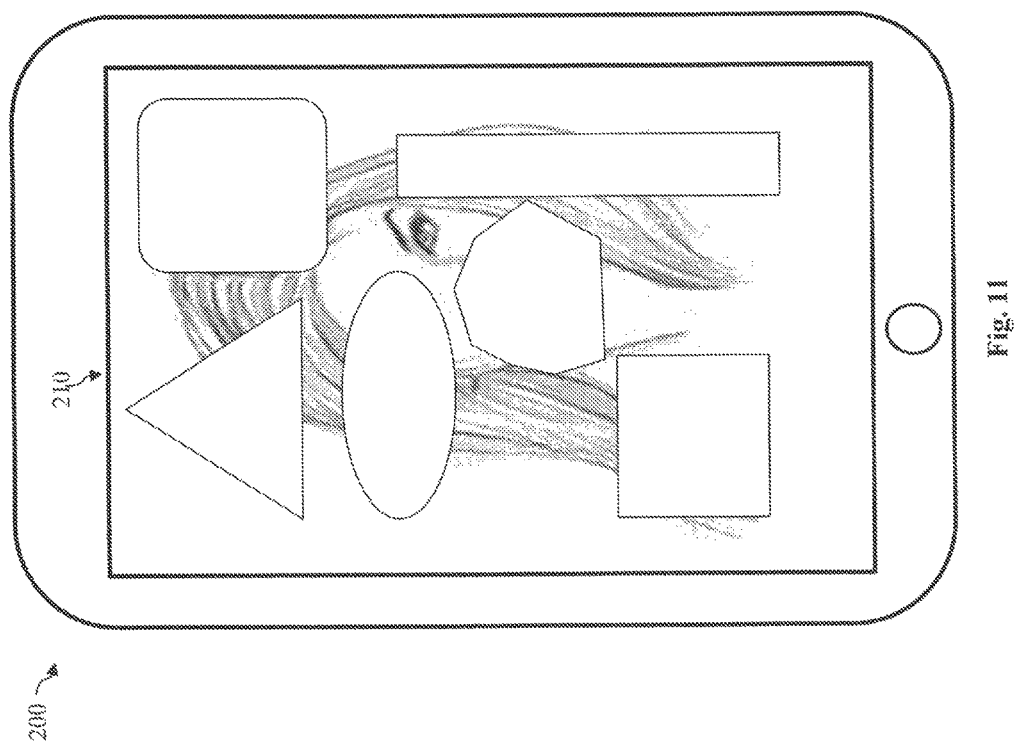

Referring now to the embodiment shown in FIG. 8, the obfuscation of the visual content may also be performed by replacing the visual content with a predetermined image. For example, the predetermined image may be an image of a stop sign, so as to signify that the user B should stop attempting to screenshot the visual content on the screen 210. It is understood that the stop sign is merely an example of a predetermined image. In other embodiments, the predetermined image may be a blank space or blank image or any other image, for example a random image retrieved from user B's picture gallery on the mobile computing device 200. Therefore, instead of capturing the picture or video sent by the user A, the user B captures a useless image.

The obfuscation of the visual content may also be performed by distorting the original visual content. For example, in the embodiment shown in FIG. 9, the visual content herein (i.e., a picture sent by user A) is significantly compressed or shrunk vertically. In the embodiment shown in FIG. 10, the visual content herein is significantly compressed or shrunk horizontally, in the embodiment shown in FIG. 11, one or more predefined geometric shapes may be overlaying the visual content herein. These predefined geometric shapes may include, but are not limited to, triangles, rectangles, squares, circles, ovals, polygons, etc. These predefined geometric shapes prevent the user B from clearly seeing the original copy of the visual content, thereby defeating his intent to capture the picture or video from user A without her permission.

It is understood that the techniques of obfuscation discussed herein are merely examples, and that the visual content may be obfuscated in other manners in alternative embodiments. It is also understood that in some embodiments, the obfuscation of the visual content is temporary. For example, the visual content may be obfuscated up until the point that the screenshot is recorded by the mobile computing device. As such, the recorded screenshot of the visual content is an obfuscated, copy of the original visual, content. Thereafter, the visual content displayed on the screen 210 no longer needs to be obfuscated, that is, until the next time the user B attempts to record a screenshot of the visual content again.

Figure 12:
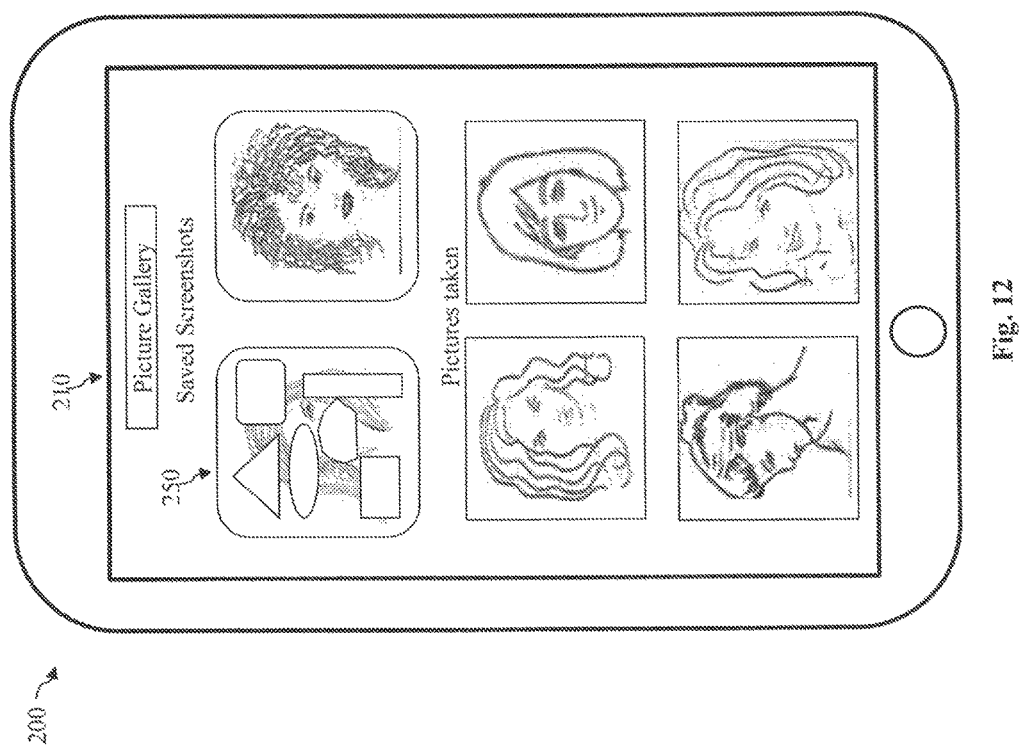

It is also understood that in some embodiments, the obfuscation discussed herein may be applied "after the fact" For example, there may be situations where the screenshot is recorded too quickly before the visual content displayed on the screen 210 can be sufficiently obfuscated. In these situations, the app 120A may access the electronic gallery of the mobile computing device 200 where the electronic or digital screenshot of the visual content is stored. Referring to FIG. 12, the app 120A may then retroactively obfuscate a saved screenshot 250 (for example, by retrieving the most recently saved screenshot in the memory storage of the mobile computing device 200) in similar manners as discussed above. Thus, the saved screenshot in the electronic gallery of the mobile computing device 200 may be darkened, discolored, replaced by a different image, distorted, or have geometric shapes overlain. Furthermore, in some embodiments, the app 120A may be able to delete the unauthorized screenshot image from the electronic gallery of the mobile computing device 200. For example, any screenshots recorded during an active session of the app 120A may be considered unauthorized and may be deleted by the app 120A from the electronic storage (e.g., internal memory or SD card) of the mobile computing de vice 200.

By obfuscating or deleting the recorded visual content "after the fact", the user B's intent of recording the visual content sent by user A without her permission is also defeated. For example, instead of being able to look at a copy of the original picture or video sent by user A, user B is only able to view a dark screen, a colored screen, another meaningless image, a distorted picture of the user A's picture, the user A's picture with seemingly random objects/shapes drawn thereon, or with no image to view (when the screenshot is deleted). This may frustrate the user B enough so that he may delete the recorded screenshot (if it has not been deleted by the app 120A already), and it may discourage him from attempting to record screenshots without authorization in the future.

Figure 13:
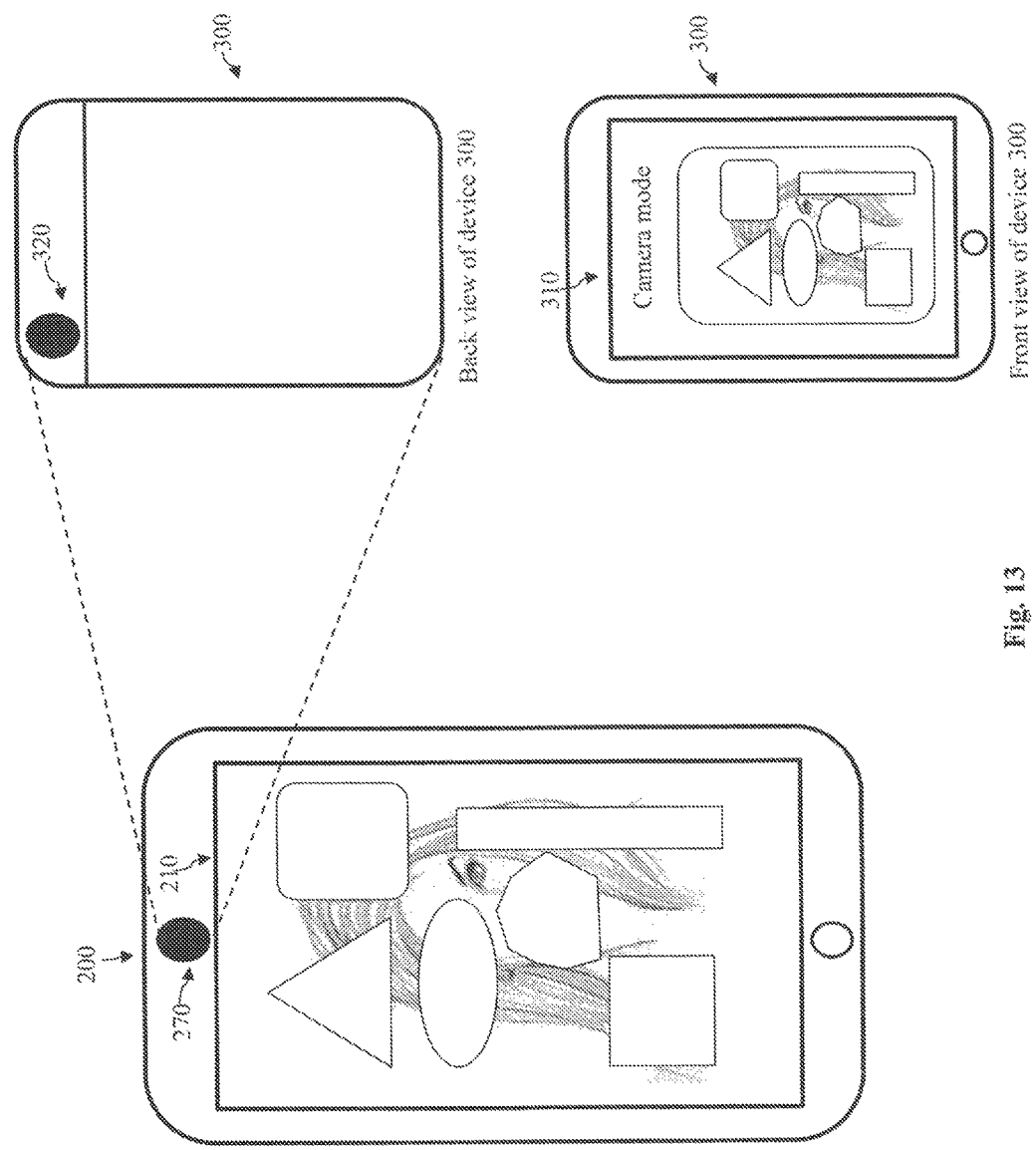

The discussions above pertain to detecting unauthorized electronic recording of visual content via screenshots. However, referring to FIG. 13, the user B may also use another camera-equipped electronic device 300 in an attempt to electronically record the visual content shared by user A. In more detail, the device 300 may be a camera, a smartphone, or a tablet computer, and it has a screen 310 as well as a camera module 320 (e.g., a back-facing camera) implemented thereon. Via the camera module 320, the device 300 may electronically record the visual content shown on the screen 210.

To thwart this unauthorized recording of the visual content, the mobile computing device 200 also includes a camera module 270. The camera module 270 may be a front-facing camera module. The app 120A includes instructions that allow the front-facing camera module 270 to detect another camera pointing at (or "looking" at) it. For example, the camera module 270 may continuously capture images and analyze these captured images to determine if any of the images contain an object that resembles a camera. In that regard, the lenses of cameras often have outlines or contours that resemble a circle, an oval, or a rounded rectangle. The software code in the app 120A scans the captured images to determine if a circle, an oval, or a rounded rectangle is present. If so, it may then analyze the object around the circle, oval, or rounded rectangle to determine if that object resembles a phone, tablet, or a point-and-shoot camera, in that regard, the outlines or contours of phones, tablets, or point-and-shoot cameras often have a rectangular shape. Accordingly, if the app 120A defects a circle/oval/rounded rectangle (i.e., resembling a camera lens) within another rectangular object (i.e., resembling the camera-equipped device 300), then it may determine that another camera is pointing at its screen 210, which indicates that the visual content displayed on the screen 210 may be recorded without, authorization. As such, the app 120A may obfuscate the visual content shown on the screen 210 so that whatever electronic image captured by the device 300 is also obfuscated. Alternatively, the app 120A may also instruct the mobile computing device 200 to restart or play a loud audio signal as discussed above.

Figure 14:
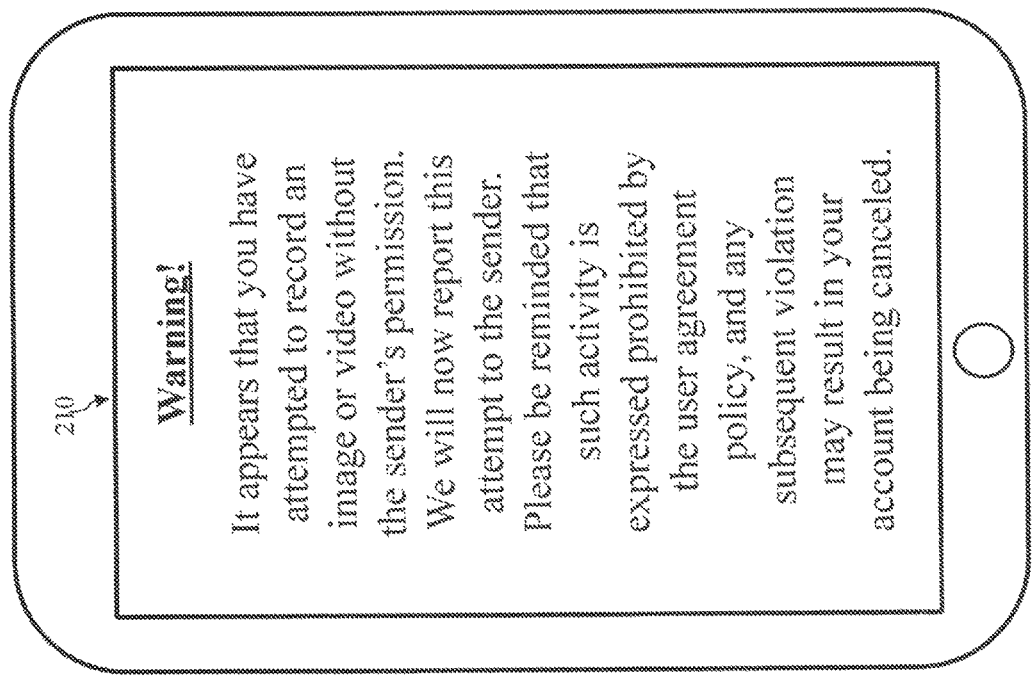

Referring now to FIG. 14, the app 120A may display a warning message to the user B once it detects the attempted unauthorized electronic recording, regardless of whether it is in the form of a screenshot of the visual content or in the form of using another camera-equipped device to take a picture of the visual content. As an example, the following message may be displayed on the screen 210, "Warning! It appears that yon have attempted to record an image or video without the sender's permission. We will now report this attempt to the sender. Please be reminded that such activity is expressed prohibited by the user agreement policy, and any subsequent violation may result in your account being canceled."

Figure 15:
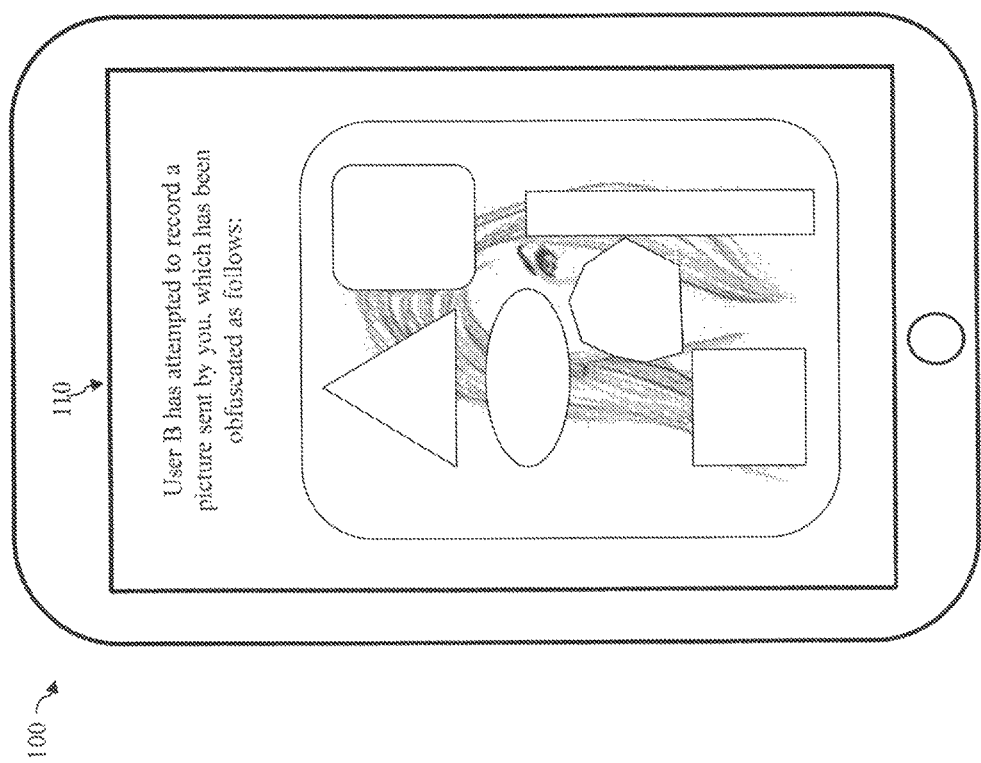

Referring now to FIG. 15, the app 120A may also notify the user A that the user B has attempted to electronically record her picture or video without permission. In the embodiment shown in FIG. 15, the app 120A may display the following message on the screen 110 of the user A's mobile computing device 100, "User B has attempted to record a picture sent by you, which has been obfuscated as follows." An obfuscated copy of the picture that is actually screenshotted by the mobile computing device 200 of user B is shown on the screen 110 of the mobile computing device 100 as well so that the user A is aware which picture that the user B attempted to record, and how much obfuscation has been done to the picture.

Figure 16:
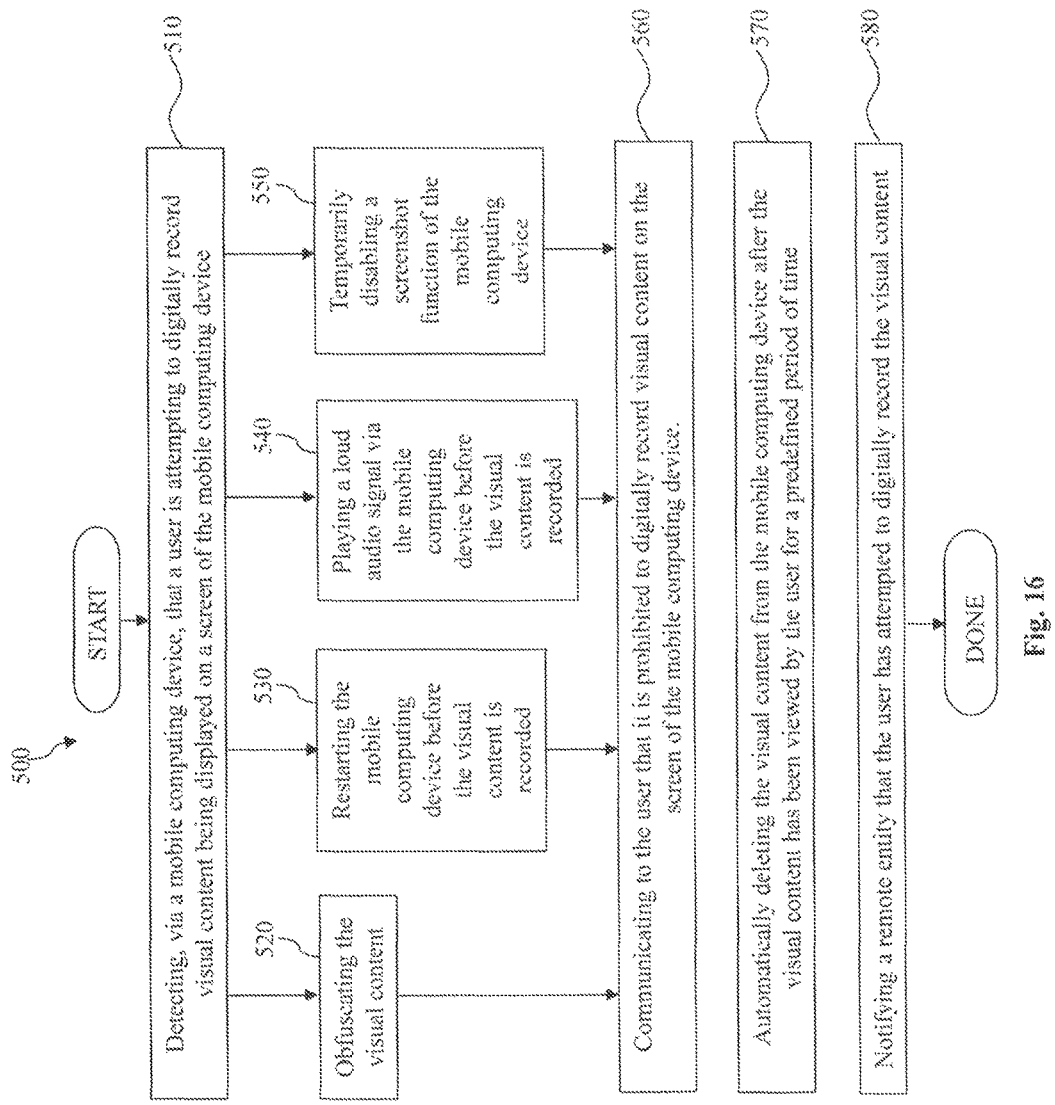
FIG. 16 is a flowchart illustrating an example method for preventing unauthorized recording of visual content displayed on a mobile computing device according to various aspects of the present disclosure.

FIG. 16 is a simplified flowchart illustrating a method 500 for preventing unauthorized electronic recording of digital visual content, displayed on a mobile computing device discussed above according to some embodiments. In some embodiments, the mobile computing device includes a mobile telephone (e.g., a smartphone), a tablet computer, a laptop computer, or a smart watch or glass. In some embodiments, one or more (or all) of the steps of the method 500 may be performed by a mobile application running on the mobile computing device.

The method 500 includes a step 510 of detecting, via a mobile computing device, that a user is attempting to digitally record visual content being displayed on a screen of the mobile computing device. In some embodiments, the visual content includes a picture or a video, for example a picture or a video sent to the mobile computing device by another mobile computing device. In some embodiments, the step 510 of detecting includes detecting that the user is attempting to screenshot the visual content via the mobile computing device. In some other embodiments, the step 510 of detecting includes detecting that die user is attempting to record a picture or a video of the visual content via a camera external to the mobile computing device.

Once the method 500 detects that the user is attempting to digitally record the visual content being displayed on the screen of the mobile computing device, the method 500 may performed one or more of the steps 520-550. For example, the method 500 may perform a step 520 of obfuscating the visual content. In some embodiments, the obfuscating comprises at least one of the following: temporarily darkening the screen, temporarily discoloring the screen, replacing the visual content with a predetermined image, or distorting the visual content. In some embodiments, the distorting of the visual content comprises overlaying one or more predefined geometric shapes on the visual content. In some embodiments, the obfuscating is performed before and until the visual content is actually recorded by the mobile computing device such that an actually recorded visual content is obfuscated. In some other embodiments, the obfuscating includes obfuscating an actually recorded visual content that is stored in an electronic storage component of the mobile computing device.

As another example, the method 500 may perform a step 530 of restarting the mobile computing device before the visual content is recorded.

As yet another example, the method 500 may perform a step 540 of playing a loud audio signal via the mobile computing device before the visual content is recorded.

As one more example, the method 500 may perform a step 550 of temporarily disabling a screenshot function of the mobile computing device.

After the method 500 performs one or more of the actions 520-550, the method 500 proceeds to a step 560 of communicating to the user that, it is prohibited to digitally record visual content on the screen of the mobile computing device.

The method 500 also includes a step 570 of automatically deleting the visual content from the mobile computing device after the visual content has been viewed by the user for a predefined period of time. In some embodiments, the step 570 may include automatically deleting, from the electronic storage of the mobile computing device, whatever screenshots that may be captured by the mobile computing device during an active session of the mobile application.

The method 500 also includes a step 580 of notifying a remote entity that the user has attempted to digitally record the visual content. The notifying step 580 includes sending the remote entity a digital copy of the visual content that is actually recorded by the mobile computing device.

It is understood that, unless otherwise specified, the steps 510-580 of the method 500 are not necessarily performed in numerical order. It is also understood that addition steps may be performed before, during, or after the steps 510-580. For example, the method 500 may include a step of receiving the visual content from a remote entity before the detecting step 510. For reasons of simplicity, other additional steps are not discussed in detail herein.

FIG. 17 is a simplified block diagram of an electronic device 3300 according to the various aspects of the present disclosure. The electronic device 3300 may be implemented as an embodiment, of the mobile computing device 100 discussed above.

The electronic device 3300 includes a telecommunications module 331 which may also be referred to as a radio component. The telecommunications module 3310 contains various electronic circuitry components configured to conduct telecommunications with one or more external devices. The electronic circuitry components allow the telecommunications module 3310 to conduct telecommunications in one or more of the wired or wireless telecommunications protocols, including communications protocols such as IEEE 802.11 (WiFi), IEEE 802.15 (Bluetooth), GSM, CDMA, LTE, WIMAX, DLNA, HDMI, etc. In some embodiments, the telecommunications module 3310 includes antennas, filters, low-noise amplifiers, digital-to-analog (DAC) converters, analog-to-digital (ADC) converters, and transceivers. The transceivers may further Include circuitry components such as mixers, amplifiers, oscillators, phase-locked loops (PLLs), and/or filters. Some of these electronic circuitry components may be integrated into a single discrete device or an integrated circuit (IC) chip. By way of these transceivers, the telecommunications module 3310 may be used to establish connections to the venues hosting the electronic virtual social networks, or establish connections with other devices on the electronic virtual social network, or establish connections with a remote server.

The telecommunications module 3310 may also include a GPS module 3315. As discussed above, the GPS module 3315 may be used to determine the location of the electronic device 3300, or the departure of the electronic device 3300 from a certain venue, etc.

The electronic device 3300 may include a computer memory storage module 3320. The memory storage module 3320 may contain various forms of digital memory, such as hard disks, FLASH, SRAM, DRAM, ROM, EPROM, memory chips or cartridges, etc. Computer programming code may be permanently or temporarily stored in the memory storage module 3320, for example. In some embodiments, the computer memory storage module 3320 may include a cache memory where files can be temporarily stored.

The electronic device 3300 may also include a computer processing module 3330. The computer processing module 3330 may contain one or more central processing units (CPUs), graphics processing units (GPUs), or digital signal processors (DSPs), which may each be implemented using various digital circuit blocks (including logic gates such as AND, OR, NAND, NOR, XOR gates, etc) along with certain software code. The computer processing module 3330 may be used to execute the computer programming code stored in the memory storage module 3320.

The electronic device 3300 may also include an input/output module 3340, which may serve as a communications interlace for the electronic device 3300. In some embodiments, the input/output module 3340 may include one or more touch-sensitive screens, physical and/or virtual buttons (such as power and volume buttons) on or off the touch-sensitive screen, physical and/or virtual keyboards, mouse, track balls, speakers, microphones, light-sensors, light-emitting diodes (LEDs), communications ports (such as USB or HDMI ports), joy-sticks, image-capture devices (for example cameras), etc. In some embodiments, the touch-sensitive screen may be used to display visual objects discussed above, for example the profile pictures of the users of the virtual social network, or the virtual gifts and digital vouchers. In alternative embodiments, a non-touch screen display may be implemented as a pan of the input/output module 3340.

According to the various aspects of the present disclosure, the virtual social network software application may reside in the memory storage module 3320. It can be retrieved by the computer processing module 3330 for execution. During its execution, it may take command of the telecommunications module (e.g., the Wi-Fi transceiver or OPS module 3315 implemented therein) and/or the input/output module 3340 (e.g., to display objects on a screen and receive input from the screen), so as to facilitate the user's participation of the electronic virtual social network via the electronic device 3300. in some embodiments, the electronic device 3300 is equipped to execute the methods (such as method 500) described above with reference to FIGS. 1-16, respectively.

FIG. 18 is a simplified diagrammatic view of a system 3400 that may be used to carry out certain aspects of the electronic virtual social network of the present disclosure discussed above. In some embodiments, the system 3400 may include an electronic device 3410. The electronic device 3410 may be implemented as an embodiment of the electronic device 3300 of FIG. 17 (and therefore as an embodiment of the mobile computing device 100 discussed above). In some embodiments, the electronic device 3410 includes-a tablet computer, a mobile telephone, a laptop, a smart watch, or a smart glass.

The system 3400 also includes a remote server 3420. The remote server 3420 may be implemented in a "cloud" computing environment and may include one or more databases that store files, for example the various files that can also be stored locally in the electronic device 3410 as discussed above. The remote server 3420 may also collect data from the electronic device 3410 to facilitate the user of the electronic device 3410's participation on the electronic virtual social network.

The electronic device 3410 and the remote server 3420 may be communicatively coupled together through a network 3430. The network 3430 may include cellular towers, routers, switches, hubs, repeaters, storage units, cabling (such as fiber-optic cabling or telephone cabling), and other suitable devices. The network 3430 may be implemented using any of the suitable wired or wireless networking protocols. The electronic device 3410 and the remote server 3420 may also be able to communicate with other devices on the network 3430 and either carry out instructions received from the network, or send instructions through the network to these external devices to be carried out.

To facilitate user's interaction with the electronic virtual social network, a service provider (that hosts or operates the remote server 3420) may provide a user interface module 3440. The user interface module 3440 may include software programming code and may be installed on the electronic device 3410 (for example in a memory storage module). In some embodiments, the user interface module 440 may include a downloadable "app", for example an app that is downloadable through a suitable service such as APPLE's® ITUNES®, THE APP STORE® from APPLE®, ANOROID's® PLAY STORE AMAZON's® INSTANT VIDEO®, MICROSOFT's® WINDOWS STORE®, RESEARCH IN MOTION's® BLACKBERRY APP WORLD®, etc. In the embodiment shown, the user Interface module 3440 includes an instance of the "app" (e.g., app 120A) that has been downloaded and installed on the electronic device 3410. The app may also be used to perform the various aspects of the present disclosure discussed above, for example sending and/or receiving visual content, automatically deleting the visual content based on a sender-specified timer, and preventing unauthorized electronic recording of the visual content, etc.

A user 3450 may interact with the system 3400 by sending instructions to the electronic device 3410 through the user interface module 3440. For example, the user 3450 may be a subscriber of the services offered by the service provider running/hosting/operating the remote server 3420. The user 3450 may attempt to log in to the remote server 3420 by launching the "app" of the user interface 3440. The user's login credentials are electrically sent to the remote server 3420 through the network 3430. After verifying the user login credentials, the remote server 3420 may instruct the user interface module 3440 to display a suitable interface to interact with the user in a suitable manner.

In some embodiments, the system 3400 further includes an electronic device 3500 that resides at a venue that is hosting the virtual social network. The electronic device 3500 may include a smartphone, a tablet computer, a desktop computer, a laptop computer, a wireless router, etc. The electronic device 3500 is communicatively coupled to the remote server 3420 and to the electronic device 3410 through the network 3430. As such, it may be used to host the virtual social network for participant users via their respective mobile computing devices.

It should be appreciated that like reference numerals in the present disclosure are used to identify like elements illustrated in one or more of the figures, wherein these labeled figures are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
    receiving, via a first mobile device, a message sent from a second mobile device, wherein the message contains un-obfuscated visual content;
    displaying the un-obfuscated visual content on a screen of the first mobile device;
    detecting, via the first mobile device, one or more engagements with the first mobile device from a first user of the first mobile device;
    determining, based on the detecting, that the first user is attempting to screenshot the un-obfuscated visual content via the first mobile device; and
    in response to the determining, deleting an electronic file saved to an electronic memory storage of the first mobile device, the electronic file being saved as a result of the first user attempting to screenshot the un-obfuscated visual content.

2. The method of claim 1, further comprising: obfuscating the un-obfuscated visual content by:
    displaying a blank screen instead of the un-obfuscated visual content; or
    distorting the un-obfuscated visual content.

3. The method of claim 1, further comprising: in response to the determining, temporarily disabling a screenshot function of the first mobile device.

4. The method of claim 1, further comprising: in response to the determining, playing a warning sound via the first mobile device.

5. The method of claim 1, further comprising: in response to the determining, rebooting the first mobile device.

6. The method of claim 1, further comprising: in response to the determining, preventing the first mobile device from saving a screenshot of the un-obfuscated visual content to an electronic memory storage of the first mobile device.

7. The method of claim 1, further comprising: obfuscating the un-obfuscated visual content, wherein the obfuscating is performed in response to the determining or in response to detecting that a person is attempting to record, via a camera external to the first mobile device, a picture or a video of the un-obfuscated visual content.

8. A method, comprising:
receiving, via a first mobile device, a message sent from a second mobile device, wherein the message contains un-obfuscated visual content;
displaying the un-obfuscated visual content on a screen of the first mobile device;
detecting, via the first mobile device, one or more engagements with the first mobile device from a first user of the first mobile device;
determining, based on the detecting, that the first user is attempting to save the un-obfuscated visual content as an electronic file to an electronic memory of the first mobile device; and
in response to the determining, temporarily disabling a screenshot function of the first mobile device to prevent the first mobile device from saving the un-obfuscated visual content as the electronic file to the electronic memory of the first mobile device.

9. The method of claim 8, wherein the electronic memory of the first mobile device comprises an internal memory or an SD card.

10. The method of claim 8, further comprising: in response to the determining:
displaying a blank screen instead of the un-obfuscated visual content; or
distorting or discoloring the un-obfuscated visual content.

11. The method of claim 8, further comprising rebooting the first mobile device before the saving.

12. The method of claim 8, further comprising: in response to the determining, playing a warning sound via the first mobile device.

13. The method of claim 8, further comprising: in response to the determining obfuscating or deleting any electronic file that is saved to an electronic memory storage of the first mobile device as a result of the first user attempting to save the un-obfuscated visual content.

14. The method of claim 8, further comprising: obfuscating the un-obfuscated visual content in response to detecting that the first user is attempting to record a picture or a video of the un-obfuscated visual content via a camera external to the first mobile device.

15. A method, comprising:
receiving, via a first mobile device, a message sent from a second mobile device, wherein the message contains un-obfuscated visual content;
displaying the un-obfuscated visual content on a screen of the first mobile device;
determining that a person is attempting to screenshot the un-obfuscated visual content via the first mobile device, or that a person is attempting to record a picture or a video of the un-obfuscated visual content via a camera that is external to the first mobile device; and
in response to the determining, automatically rebooting the first mobile device.

16. The method of claim 15, further comprising: in response to the determining,
displaying a blank screen instead of the un-obfuscated visual content.

17. The method of claim 15, further comprising: in response to the determining
temporarily disabling a screenshot function of the first mobile device.

18. The method of claim 15, further comprising: in response to the determining, performing one or more of the following operations:
preventing the first mobile device from saving a screenshot of the un-obfuscated visual content to an electronic memory storage of the first mobile device; and
obfuscating or deleting an electronic file saved to an electronic memory storage of the first mobile device, the electronic file being saved as a result of the person attempting to screenshot the un-obfuscated visual content.

19. The method of claim 15, further comprising: in response to the determining, distorting the un-obfuscated visual content.

* * * * *